United States Patent
Chan et al.

(10) Patent No.: US 11,689,762 B2
(45) Date of Patent: Jun. 27, 2023

(54) METHOD FOR SWITCHING AUDIOVISUAL INTERFACES AND CIRCUIT SYSTEM

(71) Applicant: REALTEK SEMICONDUCTOR CORP., Hsinchu (TW)

(72) Inventors: Chun-Chieh Chan, Hsinchu (TW); Ming-An Wu, Hsinchu (TW); Hung-Shao Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/695,329

(22) Filed: Mar. 15, 2022

(65) Prior Publication Data
US 2023/0098884 A1 Mar. 30, 2023

(30) Foreign Application Priority Data
Sep. 24, 2021 (TW) .................................. 110135485

(51) Int. Cl.
*H04N 21/4363* (2011.01)
*H04N 21/41* (2011.01)

(52) U.S. Cl.
CPC ... *H04N 21/43635* (2013.01); *H04N 21/4104* (2013.01)

(58) Field of Classification Search
CPC ............... H04N 21/43635; H04N 21/4104
See application file for complete search history.

(56) References Cited

U.S. PATENT DOCUMENTS

| 2011/0113442 | A1* | 5/2011 | Kikkawa | G09G 5/006 725/25 |
|---|---|---|---|---|
| 2017/0078356 | A1 | 3/2017 | Yi et al. | |
| 2020/0365112 | A1* | 11/2020 | Oh | H04N 21/43635 |
| 2021/0240639 | A1* | 8/2021 | Shin | G06F 13/4295 |
| 2022/0109908 | A1* | 4/2022 | Chan | H04N 21/43635 |
| 2022/0150555 | A1* | 5/2022 | Chan | H04N 21/43635 |
| 2022/0417468 | A1* | 12/2022 | Nakahama | H04N 7/10 |

FOREIGN PATENT DOCUMENTS

WO WO 2017151925 A1 9/2017

OTHER PUBLICATIONS

Chun-Chieh Chan, et al., "Detection Circuit and Wake-Up Method", U.S. Appl. No. 17/367,460 filed with the USPTO filed Jul. 5, 2021.

* cited by examiner

*Primary Examiner* — Yassin Alata
(74) *Attorney, Agent, or Firm* — Li & Cai Intellectual Property (USA) Office

(57) ABSTRACT

A method for switching audio-visual interfaces and a circuit system are provided. The circuit system is disposed in a sink device. A protocol layer circuit of each of audio-visual interfaces in the sink device includes a status and control data channel control module, which is used to respond to the signals sent by the video sources continuously when the sink device is connected with audio-visual sources via the audio-visual interfaces. The multiple video sources can accordingly send FRL (fixed rate link) signals to the sink device in response to responses made by the sink device. The protocol layer circuit includes an FRL audio-visual packet detection module that starts to detect a rate of an FRL and resolve audio-visual packets for obtaining audio-visual data for the audio-visual interface that the sink device switches to.

20 Claims, 6 Drawing Sheets

METHOD FOR SWITCHING AUDIOVISUAL INTERFACES AND CIRCUIT SYSTEM

CROSS-REFERENCE TO RELATED PATENT APPLICATION

This application claims the benefit of priority to Taiwan Patent Application No. 110135485, filed on Sep. 24, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an audio-visual playback system, and more particularly to a method and a circuit system that can save time for playing audio-visual content when switching to one of audio-visual interfaces by modifying firmware in order to avoid stopping a link training process.

BACKGROUND OF THE DISCLOSURE

For satisfying the requirements for various audio-visual (audio/video) interfaces in a consumer market, a display generally has several audio-visual interfaces. For example, a modern display device may include a varying number of audio-visual interfaces such as DisplayPort and high definition multimedia interfaces (HDMI) that allow a user to switch to any of the interfaces on the display for receiving the videos in compliance with different interface specifications. Alternatively, the display may include one interface that is able to receive different plug ports and allows the user to switch to any of the ports for receiving the video delivered from different sources.

In an exemplary example, reference is made to FIG. 1, which is a schematic diagram of a conventional display with an HDMI and a DisplayPort. FIG. 2 further shows a flowchart that describes a process of establishing an audio-visual connection while switching to one of the audio-visual interfaces.

In FIG. 1, a sink device 10 can be an electronic device which is used to receive audio-visual content and play the audio-visual content. The sink device 10 is exemplarily a television or a display. The sink device 10 includes several audio-visual interfaces. As shown in the diagram, the sink device 10 has two HDMIs, e.g., an HDMI port A (111) and an HDMI port B (112), and a DisplayPort 113. The two HDMIs (111, 112) and the DisplayPort 113 respectively have power circuits such as power domains 101, 102 and 103 in the sink device 10. The power domains 101, 102 and 103 are designed to be independent of a main circuit (not shown in this figure) of the sink device 10.

In the present example, the HDMI port A (111), the HDMI port B (112) and the DisplayPort 113 are configured to connect with an audio-visual source A (11), an audio-visual source B (12) and an audio-visual source C (13) via their respective audio-visual signal lines 121, 122 and 123. In step S201 of FIG. 2, connections between the audio-visual interfaces and the audio-visual sources are established. A user can manipulate the sink device 10 to switch and connect to one of the audio-visual sources. In one example, the sink device 10 plays an audio-visual content received from the audio-visual source C (13) via the DisplayPort 113, such as in step S203, while the other two audio-visual interfaces may be in one of two scenarios as follows.

In one of the scenarios, for reducing power consumption of the sink device 10, the power domains 101 and 102 can be powered off from the main circuit. Accordingly, although the audio-visual signal lines are connected between the audio-visual interfaces, the sink device 10 cannot establish any data transmission channel with the audio-visual source A (11) and the audio-visual source B (12) through a link training process since the power domains 101 and 102 are powered off. At this time, both the audio-visual source A (11) and the audio-visual source B (12) do not issue any fixed rate link (FRL) signals due to the failed link training process. In step S205 of FIG. 2, other audio-visual interfaces that are not in operation fail to complete the HDMI link training process with the audio-visual sources, in other words, fail to continuously respond to polling by the audio-visual sources. Therefore, the audio-visual sources stop issuing the FRL signals until the connection between the DisplayPort 113 and the audio-visual signal line is switched by the user to the audio-visual source A (11) or the audio-visual source B (12).

When the user manipulates the sink device 10 to switch to receive the audio-visual content delivered from the audio-visual source A (11) via the HDMI port A (111), such as step S207 of FIG. 2, the sink device 10 turns on the power domain 101 for re-initiating the link training process between the sink device 10 and the audio-visual source A (11) by a hot plug toggle, so that the data transmission channel is established. In step S209 of FIG. 2, an HDMI hot plug toggle is turned on so as to initiate a new link training process. In step S211 of FIG. 2, the new link training process is initiated between the sink device 10 and the audio-visual source A (11). After the link training process is completed, in step S213 of FIG. 2, a fixed rate link is established for playing the audio-visual content delivered from the audio-visual source A (11), such as in step S215.

In the other scenario, although the sink device 10 does not play the HDMI audio-visual content delivered from the audio-visual source A (11) or the audio-visual source B (12), the sink device 10 still keeps the power domains 101 and 102 to be powered. Accordingly, when the HDMI cable such as the audio-visual signal line 121 or the audio-visual signal line 122 is connected with the audio-visual source A (11) or the audio-visual source B (12), the link training process can be completed for establishing the data transmission channel. Therefore, when the user wants to switch to any of the audio-visual source A (11) and the audio-visual source B (12), the link training process does not require to be re-initiated by the hot plug toggle. However, the power consumption increases since the power domains 101 and 102 are kept to be powered in this scenario.

Based on the above description, when the user wants to switch to the other audio-visual interface to receive the new audio-visual content via the current audio-visual interface, the new audio-visual content is not played until the data transmission channel for the other audio-visual interface is established for receiving the new audio-visual content. However, the user experience is negatively affected since the user needs to wait to view the new audio-visual content when switching to other audio-visual interfaces.

FIG. 3 is a circuit diagram of a conventional sink device that has two HDMIs.

A sink device 30 includes multiple HDMI ports such as an HDMI port A (301) and an HDMI port B (302) shown in the diagram. The HDMI port A (301) is connected with an audio-visual source A (31) via an audio-visual signal line 331, and the HDMI port B (302) is connected with an audio-visual source B (32) via an audio-visual signal line 332. Each HDMI port includes a physical layer and a protocol layer. For example, circuits relevant to the HDMI port A (301) include an HDMI physical layer A (311) and an HDMI protocol layer A (321), and circuits relevant to the HDMI port B (302) includes an HDMI physical layer B (312) and an HDMI protocol layer B (322). When the sink device 30 receives FRL signals via one of the HDMI ports, the corresponding HDMI physical layer converts the FRL signals into digital signals, and the HDMI protocol layer resolves the FRL signals so as to obtain audio-visual data. Therefore, the sink device 30 requires multiple HDMI protocol layers when the sink device 30 has multiple HDMI ports. Nevertheless, the circuitries of the multiple HDMI protocol layers occupy a large area since the HDMI protocol layer deals with complex high-speed signals.

SUMMARY OF THE DISCLOSURE

In view of a delay problem occurred to a display when the display is switched to one of multiple audio-visual interfaces and requires time to re-establish a data transmission channel, provided in the present disclosure is related to a method for switching audio-visual interfaces and a circuit system, by which the time spent waiting for displaying a video when a display is switched to a specific HDMI port can be saved by modifying an operating mechanism of a fixed rate link (FRL) defined by a specific version of HDMI (e.g., HDMI 2.1). For minimizing a design of circuits, the circuit system provides a receiving circuit that can be shared by multiple HDMIs.

In an aspect of the present disclosure, the circuit system is adapted to a sink device. The circuit system is such as an audio-visual processing chip. Every audio-visual interface of the sink device includes a status and control data channel control module that communicates with an audio-visual source through a status and control data channel. The status and control data channel control module allows the audio-visual source to poll data for determining whether or not the multiple audio-visual interfaces of the sink device are in continuous operation. The audio-visual interface includes an FRL audio-visual packet detection module that is used to re-establish the fixed rate link by performing steps such as detecting signals, determining a transmission rate of the fixed rate link, and determining FRL packets.

The circuit system is configured to perform a method for switching audio-visual interfaces. In the method, when the sink device connects with the multiple audio-visual sources via the corresponding audio-visual interfaces, each of the audio-visual interfaces continuously responds to a status and control data channel communication request that is sent from a corresponding one of the audio-visual sources to the sink device. In the meantime, the audio-visual source can continuously issue FRL signals to the sink device in response to the responses sent by the status and control data channel control module. Therefore, when the sink device switches to one of the audio-visual interfaces, the FRL audio-visual packet detection module starts to detect a transmission rate and packets of the fixed rate link. The sink device can therefore obtain the audio-visual data delivered from one of the audio-visual sources linked with the audio-visual interface based on rate information.

Preferably, the data continuously received by the multiple audio-visual sources from the status and control data channel control module includes one or more checkpoints set in this status and control data channel control module by the sink device.

Further, each of the multiple audio-visual interfaces of the sink device is connected with a corresponding audio-visual interface physical layer and the status and control data channel control module, and the multiple audio-visual interfaces share an audio-visual interface protocol layer via a switching circuit.

Further, when the sink device switches to one of the audio-visual interfaces, other audio-visual interfaces that are not playing audio-visual content continuously respond to the status and control data channel communication request issued by each of the audio-visual sources through the status and control data channel control module. Therefore, each of the audio-visual sources can continuously send the FRL signals according to the responses issued by the sink device continuously. Accordingly, the sink device and each of the audio-visual sources complete link training.

After the transmission rate is obtained by resolving the audio-visual packets, the circuit system can reset parameters of the audio-visual interfaces and the audio-visual interface physical layers of the sink device for obtaining audio-visual data via the fixed rate link.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
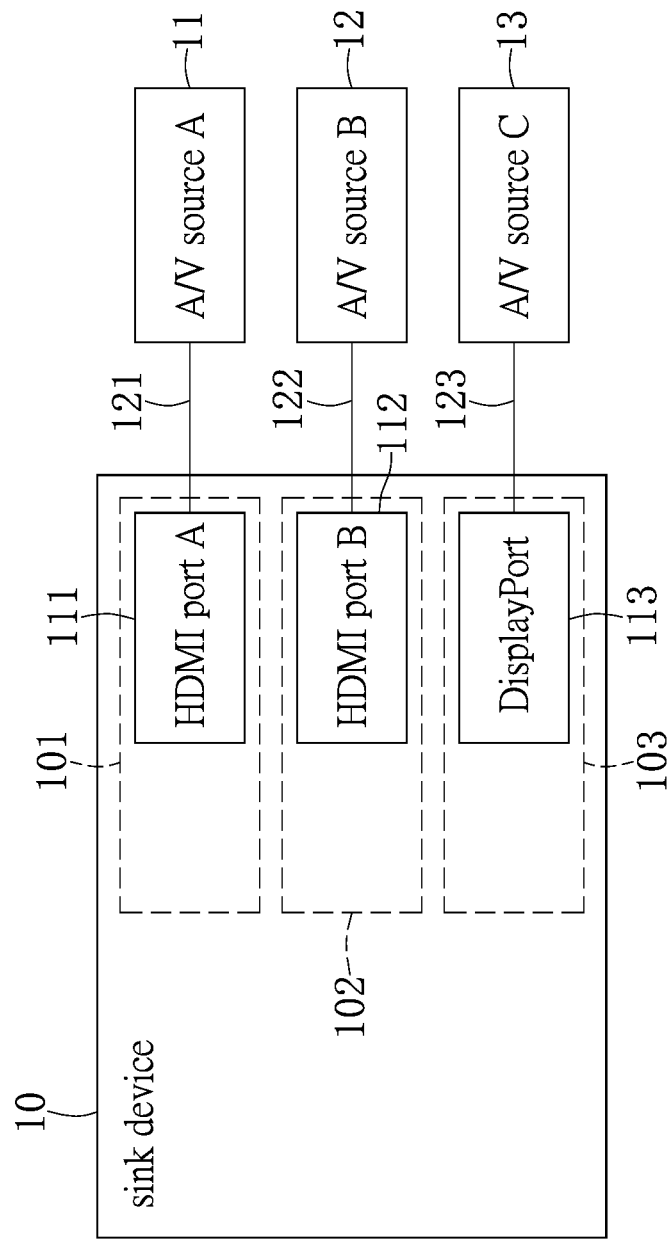
FIG. 1 is a schematic diagram depicting a conventional display structure including an HDMI and a DisplayPort.
Figure 2:
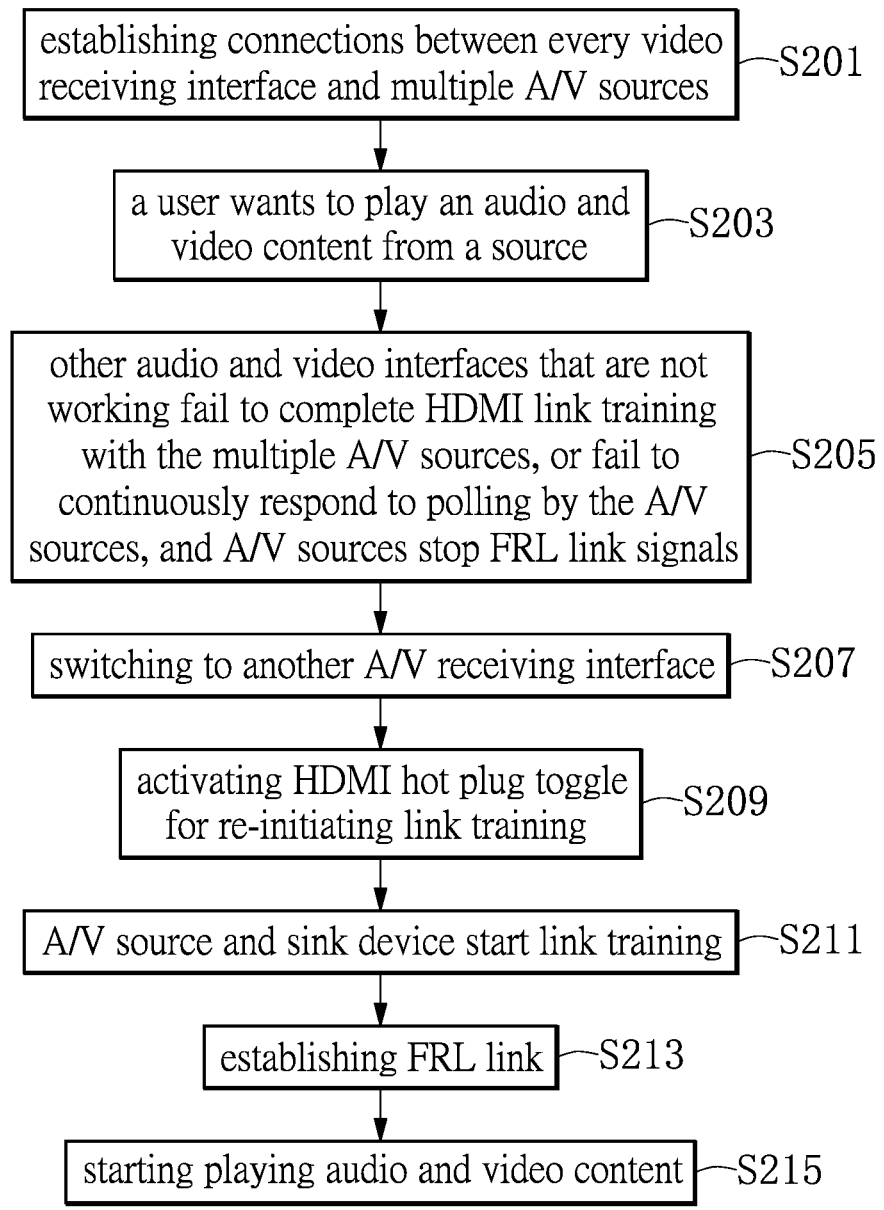
FIG. 2 is a flowchart describing a conventional process of switching to an audio-visual interface for establishing an audio-visual connection.
Figure 3:
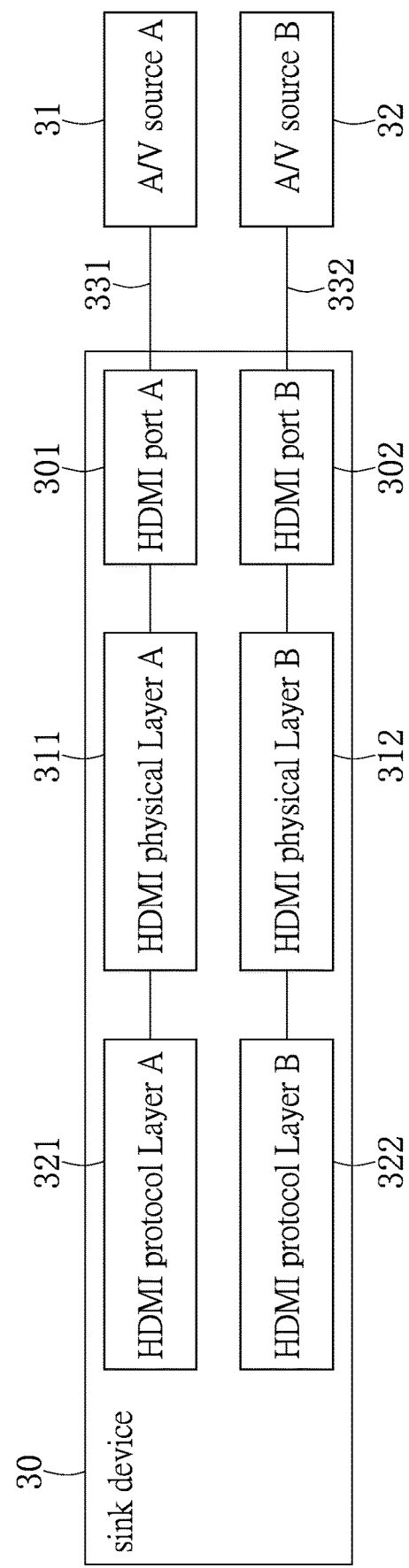
FIG. 3 is a schematic diagram depicting a circuit structure of a conventional display including an HDMI.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is relevant to a method for switching audio-visual interfaces and a circuit system. By modifying the circuitry and a manner of operation therein, the method and the circuit system can effectively save time for preparing an audio-visual content to be played when a user switches to a specific audio-visual interface. The method can also be applied to a framework in which multiple HDMI ports share a same receiving circuit for minimizing the circuits. The method can be adapted to operations of a fixed rate link (FRL) of HDMI 2.1.

Figure 4:
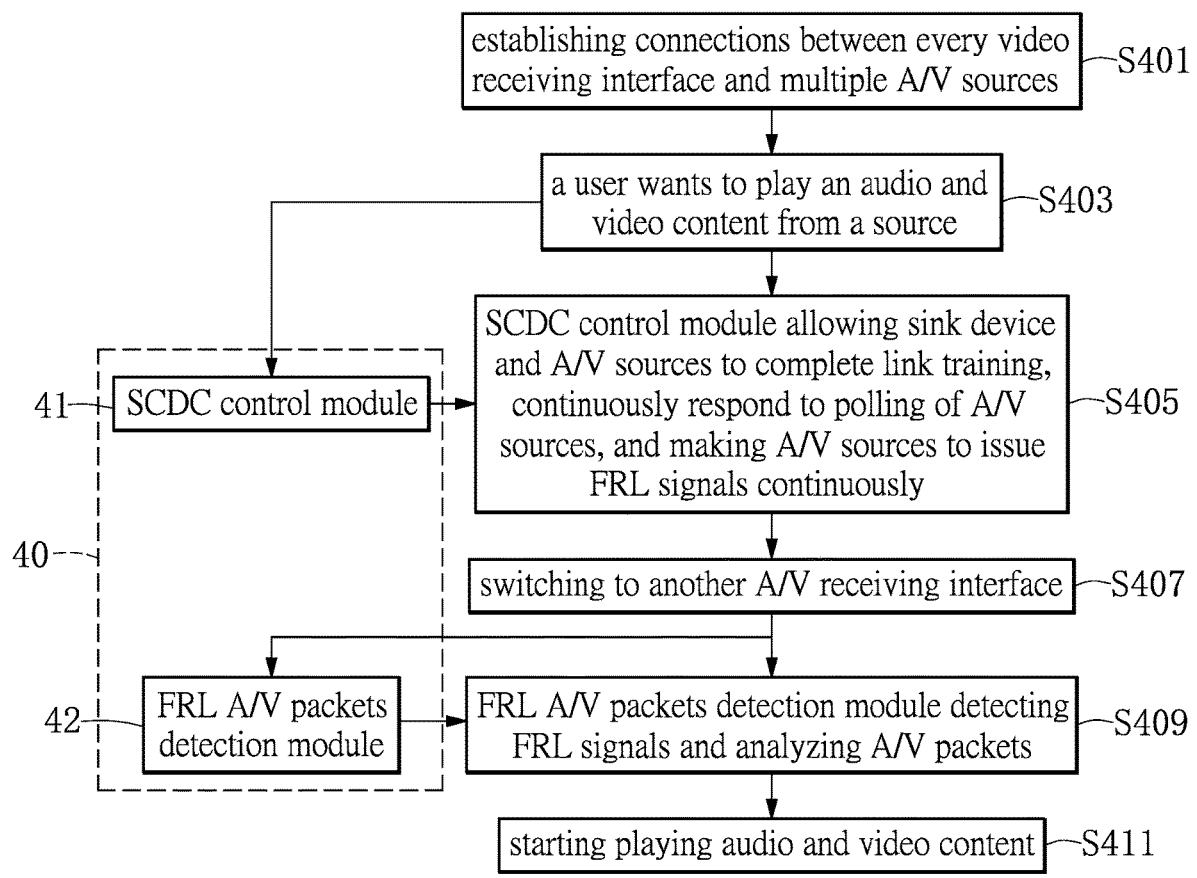
FIG. 4 is a flowchart describing a method for switching audio-visual interfaces in one embodiment of the present disclosure.
Figure 5:
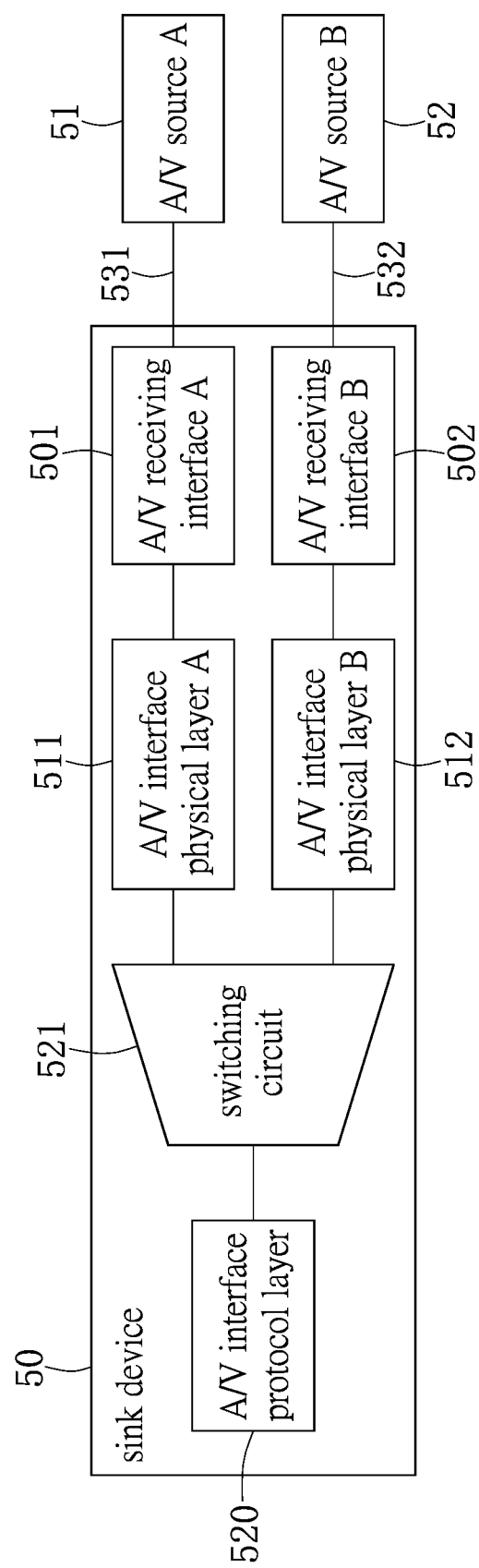
FIG. 5 is a block diagram depicting a circuit system that implements the method for switching audio-visual interfaces according to one embodiment of the present disclosure.

According to certain embodiments of the present disclosure, reference is made to FIG. 5, which is a circuit block diagram depicting a framework in which multiple HDMI ports of a sink device share a same receiving circuit. FIG. 4 shows a flowchart describing the method for switching audio-visual interfaces according to one embodiment of the present disclosure. In the circuit system adapted to the sink device, a circuit module 40 is provided in an audio-visual interface and is used to perform the method for switching audio-visual interfaces. According to one embodiment of the present disclosure, the circuit module 40 includes a status and control data channel (SCDC) control module 41 and an FRL audio-visual packets detection module 42 that can be implemented by circuits, firmware, or software.

It should be noted that, according to one embodiment of the present disclosure, the fixed rate link (FRL) can be configured to provide five fixed rates including 3 GHz, 6 GHz, 8 GHz, 10 GHz and 12 GHz, in which each of the audio-visual interfaces has its own SCDC. Since each of the audio-visual sources may have different fixed rates, the different audio-visual interfaces may not share the same status and control data channel. In the method, the sink device continuously responds to the audio-visual sources that continuously issue FRL signals. When the user switches to a specific audio-visual source, the audio-visual content is played after detecting the FRL signals and resolving the FRL audio-visual packets.

In one embodiment of the present disclosure, for implementing the method for switching audio-visual interfaces, the circuit system in the sink device is modified. For example, firmware of the status and control data channel control module 41 is modified for continuously polling data delivered from the corresponding audio-visual source. The audio-visual source can accordingly determine that the corresponding audio-visual interface of the sink device is in continuous operation, and continuously issue the FRL signals to the sink device. When the sink device is switched to the audio-visual interface, the audio-visual interface can detect the FRL signals so as to start to receive audio-visual data. Therefore, the time spent on switching to the audio-visual interface can be successfully saved.

When an audio-visual signal line is used to connect the HDMI port with the audio-visual source of the sink device, the status and control data channel control module 41 of the sink device is communicated with the audio-visual source, e.g., an online audio-visual platform, via a status and control data channel (SCDC). A link training process for the fixed rate link is started after a handshaking process. In the link training process, one or more checkpoints, e.g., LTP and GAP signals shown in FIG. 6, set by the sink device are used to determine whether or not the FRL signals issued by the audio-visual source are correct. The sink device unconditionally responds to the multiple audio-visual sources that are source pass, namely correct, so that the link training process is able to be completed for allowing the multiple audio-visual sources to issue the FRL signals continuously.

Figure 6:
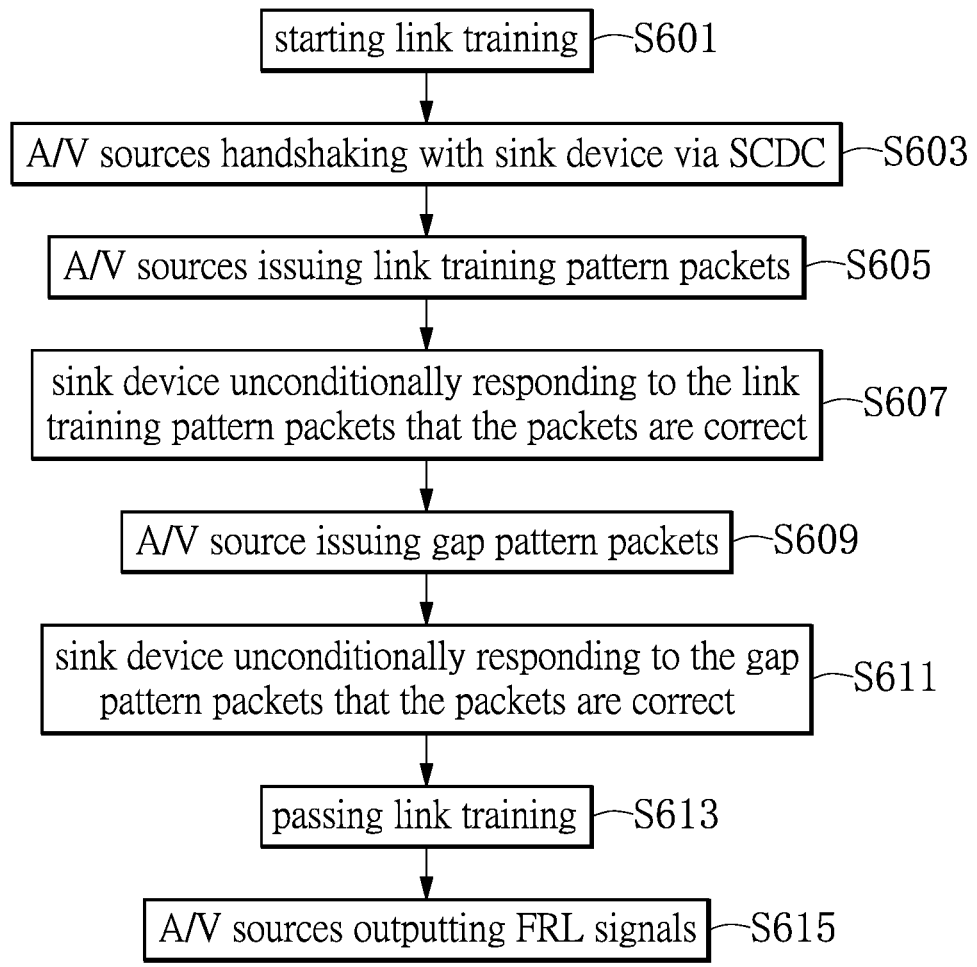
FIG. 6 is a flowchart describing a link training process for a fixed rate link in one embodiment of the present disclosure.

Reference is made to FIG. 6, which is a flowchart describing the link training process for the fixed rate link according to one embodiment of the present disclosure. In the link training process, the sink device continuously responds to a status and control data channel communication request sent from the audio-visual sources for allowing the audio-visual sources to issue the FRL signals continuously, such that the sink device can therefore receive the audio-visual data. It should be noted that the status and control data channel control module 41 of the circuit module 40 uses low-speed signals to establish the status and control data channel, so that power for maintaining the status and control data channels is slightly increased.

When the user manipulates a remote control to control the sink device to switch from an original HDMI port that plays audio-visual contents to one of the HDMI ports for receiving a corresponding audio-visual data, an FRL audio-visual packets detection module of the circuit system can identify the signals online, such as a type of gap packets, under a power-saving mode of an audio-visual processor because the audio-visual sources have already issued the FRL signals continuously. For example, the FRL audio-visual packet detection module 42 provides a low power consumption mechanism. The fixed rate link can be re-established by detecting signals, determining a transmission rate of the fixed rate link, and determining FRL packets. After receiving the audio-visual data, the sink device starts to play the audio-visual content.

FIG. 4 is a flowchart describing the method for switching audio-visual interfaces according to one embodiment of the present disclosure. Firstly, such as in step S401, a plurality of connections between the multiple audio-visual interfaces of the sink device and the multiple audio-visual sources are established. Next, in step S403, the user manipulates a remote control to control the sink device to play an audio-visual content delivered from one of the audio-visual sources. In the meantime, such as in step S405, other audio-visual interfaces that are not in operation continuously respond via the status and control data channel control module 41 to the status and control data channel communication request issued from the corresponding audio-visual sources. In other words, the audio-visual interfaces that are not in operation continuously respond to the polling requests sent by the audio-visual sources for allowing the audio-visual sources to issue the FRL signals continuously in response to the responses made by the sink device, such that the link training process between the sink device and the audio-visual sources is completed.

In step S407, the user attempts to switch to a specific audio-visual interface. In step S409, the FRL audio-visual packet detection module 42 of the circuit module 40 starts to detect a transmission rate of the fixed rate link. The sink device resolves the audio-visual packets for obtaining the transmission rate of the audio-visual data, or other information such as a video resolution. In the sink device, an HDMI receiver resets parameters of the circuits with respect to the audio-visual interface according to the transmission rate of the fixed rate link so as to convert the signals of the fixed rate link into signals that are resolvable by the HDMI receiver. Accordingly, both the sink device and the audio-visual source can transmit and receive data based on the rate information. The audio-visual source that is connected with the audio-visual interface then transmits audio-visual data via the fixed rate link. The sink device receives the audio-visual data delivered from the audio-visual source based on the rate information with respect to the audio-visual interface to be switched. Afterwards, such as in step S411, the audio-visual content is played after the audio-visual data is decoded.

It should be noted that, in the flowchart shown in FIG. 4, a link training process with the audio-visual source is re-initiated when the user switches the sink device to the audio-visual source via a hot plug toggle. For saving time for establishing the data transmission channel, the circuit system that performs the above method uses the status and control data channel control module 41 to enable the audio-visual source to issue the FRL signals continuously when an HDMI audio-visual signal line of the sink device is connected to the audio-visual source. When the user switches the sink device to the audio-visual source, the FRL audio-visual packet detection module 42 starts to detect the FRL signals, receives the audio-visual data, and plays the audio-visual content. It should be noted that, in the above-mentioned method, a traditional hot plug toggle is not required to re-initiate the link training process in switching the audio-visual interface.

According to the embodiment of the method for switching audio-visual interfaces shown in FIG. 4, the method is able to save the time for re-initiating the link training process when establishing the data transmission channel through the hot plug toggle of the sink device. An amount of the time that is saved is dependent on the time spent to re-initiate the link training process after the audio-visual source receives a signal from the hot plug toggle.

Reference is made to FIG. 5, which is a block diagram depicting the circuit system that implements the method for switching audio-visual interfaces according to one embodiment of the present disclosure.

A sink device 50 is shown in the diagram. The sink device 50 uses a same circuitry to support multiple audio-visual interfaces such as multiple HDMI ports. Taking HDMI circuits as an example, each of the audio-visual interfaces is connected with a corresponding processing circuit. The audio-visual interface is such as an audio-visual interface A (501) and an audio-visual interface B (502) shown in the diagram. In one embodiment of the present disclosure, the circuit system provides a circuit module that includes the status and control data channel control module 41 and the FRL audio-visual packet detection module 42. For example, the circuit module that includes the status and control data channel control module 41 and the FRL audio-visual packet detection module 42 can be represented by a circuit module 40a and a circuit module 40b that are installed in the circuits of each of the audio-visual interfaces. In addition to the audio-visual interface A (501) and the audio-visual interface B (502) being connected with an audio-visual interface physical Layer A (511) and an audio-visual interface physical Layer B (512) respectively, the audio-visual interface A (501) and the audio-visual interface B (502) also are connected with circuits of a shared protocol layer via a switching circuit 521, e.g., a multiplexer. The shared protocol layer is such as an audio-visual interface protocol layer 520. According to one embodiment of the present disclosure, the audio-visual interface A (501) and the audio-visual interface B (502) respectively have the circuit modules shown in FIG. 4. In FIG. 4, the circuit modules in each of the audio-visual interface A (501) and the audio-visual interface B (502) can be the status and control data channel control module (numbered 41, as shown in FIG. 4) and the FRL audio-visual packet detection module (numbered 42, as shown in FIG. 4). The status and control data channel control module receives a minimum operating current supplied by a power circuit (not shown in the figures) of the circuit system. When the audio-visual interface in the sink device is powered off, for example, when a main current of the circuit system is turned off, the minimum operating current allows the audio-visual source to poll data. The sink device 50 is able to be connected to different audio-visual sources via audio-visual signal lines 531 and 532 by the audio-visual interface A (501) and the audio-visual interface B (502). The audio-visual sources can be such as an audio-visual source A (51) and an audio-visual source B (52) shown in the figures.

It should be noted that, when the user plays audio-visual content delivered from the audio-visual source A (51), the audio-visual interface A (501), the audio-visual interface physical layer A (511), the switching circuit 521 and the audio-visual interface protocol layer 520 are continuously powered on by the circuit system. In the meantime, the circuit system can turn off power supplied to other circuits that are not in operation, such as the audio-visual interface B (502) and the audio-visual interface physical layer B (512). On the other hand, when the user switches the audio-visual source A (51) to the audio-visual source B (52), the audio-visual interface B (502) and the audio-visual interface physical layer B (512) are required to be powered. However, since the status and control data channel control module (numbered 41, as shown in FIG. 4) is configured to communicate with the audio-visual source B (52) continuously, the audio-visual source B (52) issues the FRL signals, and the FRL audio-visual packet detection module (numbered 42, as shown in FIG. 4) is configured to determine the transmission rate. Parameters with respect to the audio-visual interface B (502) and the audio-visual interface physical layer B (512) are reset for obtaining the audio-visual data sent from the audio-visual source B (52).

Thus, the status and control data channel control module allows the audio-visual source to issue the FRL signals continuously. For example, when the user plays audio-visual content delivered from an audio-visual source A, the audio-visual interface B and the corresponding audio-visual interface physical layer B can be powered off. When the circuit system receives a signal indicative of the user switching to the HDMI audio-visual source B, a power is controlled to be supplied to the audio-visual interface B and the audio-visual interface physical layer B. The FRL audio-visual packet detection module is then used to detect the FRL signals sent from the audio-visual source and receive the audio-visual data. It should be noted that the audio-visual interface protocol layer 520 can be switched to the audio-visual interface physical layer B via the switching circuit 521. The circuit system allows the same audio-visual interface protocol layer 520 to receive the audio-visual data delivered from different audio-visual sources, thereby minimalizing the circuits.

The link training process for the fixed rate link is performed according to the method for switching audio-visual interfaces provided in the present disclosure. The link training process for the fixed rate link is adapted to a transmission mode specified by HDMI 2.1. More specifically, the linking training process should be performed before the transmitter of the audio-visual source and the receiver of the sink device enter FRL mode. Reference is made to FIG. 6, which is a flowchart describing steps of the link training process.

When the sink device is connected with one of the audio-visual sources via an audio-visual signal line, a link training process for a fixed rate link is initiated between the audio-visual source and the sink device via a status and control data channel (step S601). In the meantime, the audio-visual source communicates with the sink device via the status and control data channel for establishing a handshaking process (step S603).

In the process of link training, the sink device determines whether or not the signals are correct through two checkpoints. The two checkpoints include a link training pattern packet and a gap pattern packet. More specifically, in a handshaking process of the link training process between the audio-visual source and the sink device, the circuit system of the sink device specifies the audio-visual source to issue a certain type of link training pattern for the purpose of communication there-between. The gap pattern packet is used to check the signal quality of the fixed rate link between the audio-visual source and the sink device.

In step S605, the audio-visual source issues a link training pattern packet (that is, LTP packet). Next, such as in step S607, the sink device confirms to receive the link training pattern packet and thereby determining whether or not the FRL signals issued by the audio-visual source are correct. In the meantime, the sink device unconditionally responds to a message indicating that the link training pattern packets used to check the audio-visual source are correct so as to allow the link training process to be completed. When the link training process is completed, a maximum transmission bandwidth there-between can be confirmed. The audio-visual source can therefore issue the FRL signals continuously.

Next, such as in step S609, before the audio-visual data is transmitted, the audio-visual source can firstly transmit gap pattern packets for allowing the audio-visual source to be able to prepare the audio-visual data within this period of time. However, a length of time for transmitting the gap pattern packets is determined according to duration required for the audio-visual source to prepare the audio-visual data. In order to not to lose the audio-visual data, such as in step S611, the sink device unconditionally responds to the gap pattern packets for confirming whether or not the packets are correct. In step S613, the link training process is used to maintain a status in FRL to wait for the audio-visual source to transmit the audio-visual data. Finally, in step S615, the audio-visual source outputs the FRL signals, and the sink device receives the audio-visual data according to the rate information and plays the received audio-visual content.

In summation, according to the above descriptions concerning the method for switching audio-visual interfaces and the circuit system, the circuit system includes an audio-visual interface protocol layer that is shared and multiple status and control data channel control modules. The circuit system unconditionally allows the link training pattern (LTP) and the gap pattern (GAP) to be checked correctly for allowing each audio-visual source to issue the FRL signals continuously so as to quickly respond to an operation of the user for playing the audio-visual content. The FRL audio-visual packet detection module detects the transmission rate of the link signals for resetting parameters of HDMI ports and physical layers. The sink device can receive the audio-visual data according to the transmission rate and start to play the audio-visual content. The circuit system is configured to save areas of the protocol layer circuits and the circuits that are used therein. The multiple audio-visual interfaces are then able to be connected with the audio-visual sources that have different fixed rates.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for switching audio-visual interfaces, which is operated in a circuit system, the method comprising:
   when multiple audio-visual interfaces of a sink device are connected with multiple audio-visual sources, a status and control data channel control module of the circuit system continuously responds to a status and control data channel communication request sent from a corresponding audio-visual source to the sink device;
   continuously issuing fixed rate link (FRL) signals with respect to the multiple audio-visual sources in response to responses sent by the status and control data channel control module; and
   when the sink device switches to one of the audio-visual interfaces, an FRL audio-visual packet detection module of the circuit system starts to detect the FRL signals sent by one of the audio-visual sources that corresponds to the audio-visual interface to be switched to, and establishes a fixed rate link with the audio-visual interface to be switched to, so that the sink device receives audio-visual data delivered from the audio-visual source connected with the audio-visual interface based on a rate information.

2. The method according to claim 1, wherein data continuously received by the multiple audio-visual sources via the status and control data channel control module includes one or more checkpoints set in the status and control data channel control module by the sink device.

3. The method according to claim 1, wherein, when the sink device switches to one of the audio-visual interfaces, other one or more audio-visual interfaces that are not in operation continuously respond to a status and control data channel communication request sent by each of the audio-visual sources via the status and control data channel control module, and allow each of the audio-visual sources to issue FRL signals continuously in response to responses made by the sink device, so that a link training process between the sink device and each of the audio-visual sources is completed.

4. The method according to claim 1, wherein, when starting to detect the FRL signals sent by one of the audio-visual sources that corresponds to the audio-visual interface to be switched to, audio-visual packets are resolved for obtaining a transmission rate of the audio-visual data.

5. The method according to claim 4, wherein the multiple audio-visual sources continuously receive data including one or more checkpoints set in the status and control data channel control module by the sink device via the corresponding status and control data channel control module.

6. The method according to claim 4, wherein, after the transmission rate is obtained, parameters of an audio-visual interface and an audio-visual interface physical layer of the sink device are reset for receiving the audio-visual data via a fixed rate link.

7. The method according to claim 6, wherein data continuously received by the multiple audio-visual sources via the status and control data channel control module includes one or more checkpoints set in the status and control data channel control module by the sink device.

8. The method according to claim 7, wherein the one or more checkpoints include a link training pattern packet and a gap pattern packet.

9. The method according to claim 7, wherein the sink device unconditionally responds a message indicating that the multiple audio-visual sources are correct, so that the link training process is able to be completed for allowing the multiple audio-visual sources to continuously issue the FRL signals.

10. A circuit system, adapted to a sink device, comprising:
a status and control data channel control module communicating with a corresponding one of multiple audio-visual sources via a status and control data channel and providing the corresponding audio-visual source for polling data, so as to allow the multiple audio-visual sources to determine whether or not multiple audio-visual interfaces of the sink device are in continuous operation;
a fixed rate link (FRL) audio-visual packet detection module re-establishing an FRL by detecting signals, determining a transmission rate of the FRL, and determining FRL packets;
wherein the circuit system performs a method for switching audio-visual interfaces, comprising:
when multiple audio-visual interfaces of the sink device are connected with multiple audio-visual sources, the status and control data channel control module continuously responds to a status and control data channel communication request sent from a corresponding audio-visual source to the sink device;
continuously issuing fixed rate link (FRL) signals with respect to the multiple audio-visual sources in response to responses sent by the status and control data channel control module; and
when the sink device switches to one of the audio-visual interfaces, the FRL audio-visual packet detection module of the circuit system starts to detect the FRL signals sent by one of the audio-visual sources that corresponds to the audio-visual interface to be switched to, and establishes the fixed rate link with the audio-visual interface to be switched to, so that the sink device receives audio-visual data delivered from the audio-visual source connected with the audio-visual interface based on a rate information.

11. The circuit system according to claim 10, wherein data continuously received by the multiple audio-visual sources via the status and control data channel control module includes one or more checkpoints set in the status and control data channel control module by the sink device.

12. The circuit system according to claim 10, wherein, when the sink device switches to one of the audio-visual interfaces, other one or more audio-visual interfaces that are not in operation continuously respond to a status and control data channel communication request sent by each of the audio-visual sources via the status and control data channel control module, and allows each of the audio-visual sources to issue FRL signals continuously in response to responses made by the sink device, so that a link training process between the sink device and each of the audio-visual sources is completed.

13. The circuit system according to claim 10, wherein, after the transmission rate is obtained, parameters of an audio-visual interface and an audio-visual interface physical layer of the sink device are reset for receiving the audio-visual data via a fixed rate link.

14. The circuit system according to claim 13, wherein data continuously received by the multiple audio-visual sources via the status and control data channel control module includes one or more checkpoints set in the status and control data channel control module by the sink device.

15. The circuit system according to claim 10, wherein the multiple audio-visual interfaces respectively connect with audio-visual interface physical layers and share the audio-visual interface protocol layer via a switching circuit.

16. The circuit system according to claim 15, wherein data continuously received by the multiple audio-visual sources via the status and control data channel control module includes one or more checkpoints set in the status and control data channel control module by the sink device.

17. The circuit system according to claim 15, wherein the circuit system continuously powers on the audio-visual interface physical layer, the switching circuit, and the audio-visual interface protocol layer that correspond to the audio-visual interface being switched to, and turns off power supplied to the rest of the audio-visual interfaces and the audio-visual interface physical layers that are not in operation.

18. The circuit system according to claim 17, wherein data continuously received by the multiple audio-visual sources via the status and control data channel control module includes one or more checkpoints set in the status and control data channel control module by the sink device.

19. The circuit system according to claim 18, wherein the one or more checkpoints include a link training pattern packet and a gap pattern packet.

20. The circuit system according to claim 18, wherein the sink device unconditionally responds a message indicating that the multiple audio-visual sources are correct, so that the link training process is able to be completed for allowing the multiple audio-visual sources to continuously issue the FRL signals.

* * * * *